United States Patent Office 3,544,637
Patented Dec. 1, 1970

3,544,637
POLYOXYALKYLATED HYDRAULIC FLUIDS
Ehrenfried H. Kober and Gerhard F. Ottmann, Hamden, and John E. Pregler, Wallingford, Conn., assignors to Olin Corporation, a corporation of Virginia
No Drawing. Filed Apr. 5, 1965, Ser. No. 445,706
Int. Cl. C07c 43/20
U.S. Cl. 260—613
3 Claims

ABSTRACT OF THE DISCLOSURE

Polyoxyalkylated fluids which are particularly valuable in fire-resistant, water base hydraulic fluids, are prepared by condensing a polycyclic aromatic amine or phenol with a hydroxyalkylene oxide or with an alkylene oxide followed by subsequent reaction with a hydroxyalkylene oxide.

This invention relates to new chemical products and compounds which are useful as fire-resistant functional fluids and which are particularly valuable for fire-resistant water base hydraulic fluids. This invention is also concerned with the application of such chemical products and compounds in other arts and industries, as well as with processes for manufacturing the new chemical products and compounds.

More specifically, the present invention relates to products obtained by oxyalkylation of polycyclic aromatic amines and phenols with hydroxyalkylene oxides or with alkylene oxides and hydroxyalkylene oxides. Although various oxyalkylated aromatic amines and phenols have been described, their usefulness as functional fluids is limited to certain applications since these known compounds possess a low degree of either water solubility or fire-resistance. It has been found that products obtained by reacting polycyclic aromatic amines and phenols with hydroxyalkylene oxides or with alkylene oxides and hydroxyalkylene oxides exhibit a high degree of fire-resistance and are soluble in water at −20° F. to 212° F. without undergoing phase separation. These properties make the products of this invention particularly useful as fire-resistant water base hydraulic fluids.

Moreover, the products of this invention, which are obtained by condensing polycyclic aromatic amines and phenols with hydroxyalkylene oxides or with alkylene oxides and hydroxyalkylene oxides, have more than one hydroxy group in the polyether chain or chains attached to the aromatic moieties and, therefore, can be employed as intermediates in the production of polyesters and polyurethanes.

The novel products of the present invention are conveniently prepared by condensing polycyclic aromatic amines or phenols with hydroxyalkylene oxides or with ethylene oxides and hydroxyalkylene oxides in the presence of a catalyst and in the absence or presence of a solvent.

Polycyclic aromatic amines and phenols useful as starting materials include (1) methylene diarylamines of the formula:

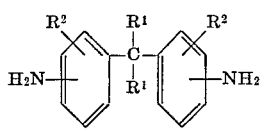

wherein $R^1$ is hydrogen or an alkyl group of one to five carbon atoms and wherein $R^2$ is hydrogen, an alkyl group of one to five carbon atoms or a halogen selected from the group consisting of fluorine, chlorine and bromine; (2) amino-substituted diphenyl ethers of the formula:

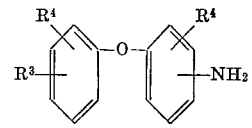

wherein $R^3$ is an amino group or hydrogen and wherein $R^4$ is hydrogen, an alkyl group of one to five carbon atoms or a halogen selected from the group consisting of fluorine, chlorine, and bromine; (3) N,N'-diphenylphenylene diamines of the formula:

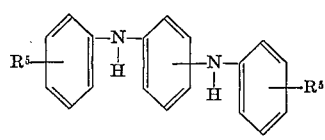

wherein $R^5$ is hydrogen, an alkyl group of one to five carbon atoms or a halogen selected from the group consisting of fluorine, chlorine and bromine; (4) hydroxy phenyl amines of the formula:

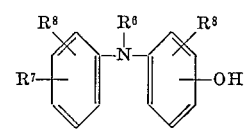

wherein $R^6$ is hydrogen or an alkyl group of one to five carbon atoms and wherein $R^7$ is a hydroxy group or hydrogen and $R^8$ is hydrogen, an alkyl group of one to five carbon atoms or a halogen selected from the group consisting of fluorine, chlorine or bromine; (5) hydroxy-substituted diphenyl methanes of the formula:

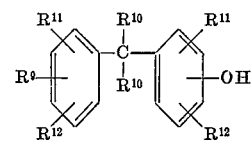

wherein $R^9$ is hydrogen or a hydroxy group, $R^{10}$ is hydrogen or an alkyl group of one to five carbon atoms and $R^{11}$ and $R_{12}$ are independently selected from the group consisting of hydrogen, alkyl of from one to five carbon atoms, or a halogen selected from the group consisting of fluorine, chlorine and bromine; (6) hydroxy-substituted diphenyl ethers of the formula:

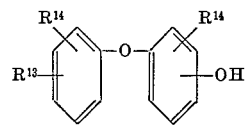

wherein $R^{13}$ is hydrogen or a hydroxy group and $R^{14}$ is hydrogen, an alkyl group of one to five carbon atoms or a halogen selected from the group consisting of fluorine, chlorine and bromine; and (7) hydroxy-substituted diphenyl compounds of the formula:

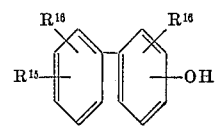

wherein $R^{15}$ is hydrogen or a hydroxy group and $R^{16}$ is hydrogen, an alkyl group of one to five carbon atoms or a halogen selected from the group consisting of fluorine, chlorine and bromine.

Polycyclic aromatic amines and phenols suitable as starting materials in the process of this invention include, for example, (1) methylene diarylamines, such as the various isomers of 4,4'-methylene dianiline, 4,4'-methylene bis(2 - methylaniline), 4,4' - isobutylmethylene bis(2-pentylaniline), 4,4'-methylene bis(2-chloroaniline), 4,4'-n-propylmethylene bis(2-chloroaniline) and 4,4'-methyl-methylene dianiline; (2) amino-substituted diphenyl ethers, such as the various isomers of oxy-4,4'-dianiline, oxy - 4,4' - bis(2-chloroaniline), p-phenoxyaniline, p-(4-chlorophenoxy) aniline; (3) N,N'-diphenyl phenylenediamines, such as the various isomers of N,N'-diphenyl-p-phenylenediamine and N,N'-ditolyl-p-phenylene diamine; (4) hydroxy phenylamines, such as the various isomers of p-anilinophenol, bis(4-hydroxyphenyl) amine and bis(3-isobutyl-4-hydroxyphenyl) amine; (5) various hydroxy-substituted diphenyl methanes, such as the various isomers of bisphenol A, 4,4'-methylene bis(2-chlorophenol), 4,4' - isopropylmethylene bis(2 - chlorophenol), 4,4' - methylene bis(2,6-dimethylphenol), 4,4'-methylene bis(2-ethyl-6-n-pentylphenol), α-phenylcresol and α-p-chlorophenylcresol; (6) hydroxy-substituted diphenyl ethers, such as the various isomers of p-phenoxyphenol, p-(4-ethylphenoxy) phenol, p-(4-chlorophenoxy) phenol, 4,4'-dihydroxydiphenyl oxide and 4,4'-dihydroxy-3,3'-dichlorodiphenyl oxide and (7) hydroxy-substituted diphenyl compounds, such as the various isomers of p,p'-biphenol, p,p' - bis(o-methylphenol), p,p'-bis(o-chlorophenol), p-phenylphenol and p-(p-chlorophenyl) phenol; and the corresponding fluorine and bromine derivatives.

Useful alkylene oxides and hydroxy alkylene oxides are characterized by the generic structures:

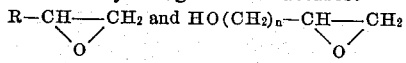

wherein R is hydrogen or an alkyl group of one to five carbon atoms and $n$ is an integer from 1 to 5 and include ethylene oxide, propylene oxide, butylene oxide, glycidol, 4-hydroxybutylene oxide, 6-hydroxyhexylene oxide, etc. Materials, such as cyclohexylvinyl oxide, can likewise be used, if desired.

Suitable catalysts for reacting the polycyclic aromatic amines and phenols of this invention with alkylene oxides and hydroxy alkylene oxides are bases, such as alkali hydroxides, as exemplified by sodium hydroxide and potassium hydroxide; alkaline earth hydroxides such as calcium hydroxide, magnesium hydroxide, etc., and alkali alkoxides, such as sodium methoxide, potassium methoxide, and sodium ethoxide.

Solvents in which the reaction leading to the products of this invention can be conducted, include alkyl ethers of polyethylene glycols, such as diethyl ether of diethylene glycol, dimethyl ether of diethylene glycol, dibutyl ether of diethylene glycol, dimethyl ether of triethylene glycol, etc. and aromatic hydrocarbons, such as toluene, xylene, etc. The reaction, however, can also be carried out in the absence of a solvent.

In one embodiment, the process for preparing the products of this invention comprises the addition of the alkylene oxide to polycyclic aromatic amines or phenols in the presence of a catalyst followed by reaction with a hydroxyalkylene oxide used as capping agent. This particular embodiment is referred to as the two-stage process. In a second embodiment of this invention, useful products are prepared by reacting polycyclic aromatic amines or phenols in the presence of a catalyst with a hydroxyalkylene oxide. This second embodiment is referred to in this specification as the single-stage process.

Although useful products can be prepared by reacting a mixture of an alkylene oxide and a hydroxyalkylene oxide with the polycyclic aromatic amine or phenol charged to the reactor thus forming random addition products, it is preferred, however, to add the alkylene oxide first and then to react the intermediate, thus obtained, with the hydroxyalkylene oxide. This avoids excessive branching in the polyether chains and provides for more linear products which have better viscosity temperature properties than the products obtained when the addition of the alkylene oxide and hydroxyalkylene oxides is reversed or when they are added at random.

The number of moles of alkylene oxide and hydroxyalkylene oxide employed in preparing products by the two-stage process can be varied widely and generally from about 1 to about 16 moles of alkylene oxide will be employed for each reactive hydrogen atom of the initially charged polycyclic aromatic phenol or amine and from about 1 to about 6 moles of the hydroxyalkylene oxide will be used per reactive hydrogen atom of the starting amine or phenol. Likewise, in preparing products by condensing a polycyclic aromatic phenol or amine with a hydroxyalkylene oxide from about 1 to about 10 moles of the hydroxyalkylene oxide will generally be utilized per reactive hydrogen atom of the initially added amine or phenol. The reactive hydrogen atoms of the starting polycyclic aromatic phenols and amines of this invention are the hydrogen atoms of the —NH₂ and —OH groups of the said compounds. With the two-stage reaction products of this invention, the first product formed by condensing a polycyclic aromatic amine or phenol with an alkylene oxide is a hydroxyl-terminated polyoxyalkylene intermediate. The hydrogen atoms of the hydroxyl groups of the intermediate are, likewise, reactive hydrogen atoms which form the point of reaction, when in the second stage, the intermediate is further condensed with a hydroxyalkylene oxide to form the final product. In preparing the novel products of this invention, mixtures of the alkylene oxides as well as the hydroxyalkylene oxides can be utilized, if desired.

The products of this invention are mixtures rather than pure compounds. As is well understood in the field of alkylene oxide chemistry when a compound having a reactive hydrogen, such as a phenol or amine, is oxyalkylated or reacted with alkylene oxide, the product resulting is a mixed product consisting of closely related homologs in which the statistical average number of oxyalkylene groups is equal to the number of moles of alkylene oxide reacted and the individual members in the mixture have varying numbers of oxyalkylene groups.

The amount of catalyst utilized will be from about 0.1 to about 5 percent and preferably, will range from about 1.0 and about 3.0 percent based on the amount of polycyclic aromatic phenol or amine employed in the reaction.

The overall reaction temperature in both single and two-stage reaction will generally range from about 90° C. to about 220° C. and preferably will be between 100 and 200° C. at atmospheric pressure, but slightly higher or lower pressures can also be used. If a solvent is employed, the products of the reaction are recovered by stripping the solvent in vacuo at temperatures up to 250° C. or by any other convenient method. The products obtained by oxyalkylation of polycyclic aromatic amines and phenols according to our invention are useful for many fluid applications. The fluid base stocks, which are water soluble, have autogenous ignition temperatures in excess of 900° F., flash points and fire points above 450° F., are compatible with seawater, and possess high shear stability.

For use as water base hydraulic fluids, the viscosity of these base stocks can be adjusted to desirable levels by addition of water. Viscosity index improvers and pour point depressants can also be added without detrimentally affecting the water solubility and fire-resistance. These fluids can be further adjusted by addition of corrosion inhibitors, pH buffers, antiwear agents and antifoam agents.

The following examples, which serve to illustrate this invention, are to be considered not limitative:

EXAMPLE I

To a 1000 ml. three-necked flask equipped with stirrer, thermometer, dropping funnel, nitrogen inlet tube and water cooled condenser there was added 101.1 g. of 4,4'-dihydroxydiphenyl oxide dissolved in 250 ml. of toluene and 3.0 g. of potassium hydroxide (min. assay 85 percent). The reaction mixture was heated, with stirring, to 105° C. and the addition of 74.0 g. glycidol (1.0 mole)

started. As the addition continued, a resinous product coated the wall of the flask and the toluene solvent became crystal clear. When 37.0 g. of glycidol (0.5 mole) had been added, the reaction was stopped and the toluene decanted from the resinous material. This resinous material was then heated to a fluid consistency and the addition of glycidol was continued until water solubility was achieved; this required the addition of 296 g. of glycidol (4.0 moles) which was added at the rate of 1.33 moles/hour. The reaction temperature was controlled between 160–180° C. When the addition of glycidol had been completed, the reaction mixture was stirred for 30 min. at 160° C. and then heated in vacuo to remove low boiling compounds (terminal pot conditions: 200° C. at 0.1 mm. Hg). A total of 362.8 (91.4 percent yield) of product, having a hydroxy number of 690, was isolated.

EXAMPLE II

A 1000 ml. three-necked flask equipped with stirrer, thermometer, dropping funnel, and water cooled condenser was charged with 133.5 g. of 4,4'-methylene-bis(2-chloroaniline) dissolved in 250 ml. of toluene and 4.2 g. of potassium hydroxide (min. assay 85 percent). While stirring, the reaction mixture was heated to 105° C. and the addition of 148.0 g. of glycidol (2.0 moles) was started. The time of addition was 4.5 hrs. during which period the pot temperature was maintained between 105° C. and 115° C. At the conclusion of glycidol addition, the reaction mixture was stirred for an additional hour at 110° C. and then cooled to room temperature. The toluene was then decanted and the bottom layer was heated in vacuo to remove low boiling components (terminal pot conditions 210° C. and 0.1 mm. Hg) to yield 219.5 g. of liquid product which corresponds to 92.3 percent of the theoretical. The hydroxyl number of the product was determined and found to be 675.

EXAMPLE III

A 1000 ml. three-necked flask equipped with stirrer, thermometer, dropping funnel, and water cooled condenser was charged with 133.5 g. of 4,4'-methylene-bis(2-chloroaniline) and 4.2 g. of potassium hydroxide (min. assay 85 percent). At 135° C. the dropwise addition of 148.0 g. of glycidol (2.0 moles) was started (stirring was started when the compound melted). The addition required 2.5 hrs. during which time the pot temperature did not exceed 140° C. When the addition had been completed, the reaction mixture was stirred for another hour and then heated in vacuo (terminal conditions: 200° C. at 0.1 mm. Hg) to afford a fluid product which weighed 271.5 g. (94.8 percent of theoretical amount). The hydroxy number was determined and found to be 556.

EXAMPLE IV

A 1000 ml. three-necked flask equipped with stirrer, drying tube, thermometer, jacketed addition funnel, and ice-water condenser, was charged with 47.0 g. (0.1785 mole) of N,N'-diphenyl-p-phenylenediamine and 2.0 g. (4.25 weight percent based on N,N'-diphenyl-p-phenylenediamine) of powdered potassium hydroxide. The mixture was then heated to 150° C. and stirring was started when the N,N'-diphenyl-p-phenylenediamine had completely melted. A total of 188.5 g. (4.28 moles) ethylene oxide was added dropwise starting at 150° C. and at such a rate that the temperature of the reaction mixture was maintained between 150° C. and 160° C. The addition of ethylene oxide was terminated after a ratio of 24 moles of ethylene oxide per mole of N,N'-diphenyl-p-phenylenediamine had been achieved. The reaction flask was then cooled to 130° C. and 55.6 g. (0.714 mole) of glycidol was added in a dropwise manner while the pot temperature was maintained at below 150° C. After the addition of glycidol had been completed, the reaction mixture was kept at 130° C. for another hour. The resulting product was then freed of low boiling components by heating to 225° C. in a vacuum of 0.1 mm. Hg. A total of 267 g. of liquid product (hydroxyl number—162) was obtained, corresponding to a 91 percent yield.

EXAMPLE V

A 2000 ml. three-necked flask equipped with stirrer, drying tube, nitrogen inlet tube, thermometer, jacketed addition funnel and ice-water cooled condenser with a Dry Ice condenser at the top was charged with 233.0 g. (1.25 moles) of p-phenoxy phenol and 3.0 g. (1.29 percent by weight based on p-phenoxy phenol) of powdered potassium hydroxide. The mixture was heated to 140° C.; stirring was started when the p-phenoxy phenol had completely melted. A total of 550.0 g. (12.5 moles) of ethylene oxide was added dropwise starting at 140° C. and at such a rate that the temperature of the reaction mixture was maintained between 135° C. and 160° C. The addition of ethylene oxide was terminated after a ratio of 10 moles of ethylene oxide per mole of p-phenoxyphenol had been reached. The reaction flask was then cooled to a temperature of 105° C. and 185 g. (2.5 moles) of glycidol was added in a dropwise manner while the pot temperature was held below 120° C. After the glycidol addition had been completed, the reaction mixture was kept at 105° C. for another hour. Low boiling components were then removed by heating the reaction mixture to 225° C. under a vacuum of 0.1 mm. Hg. A total of 953.3 g. of liquid product (hydroxyl number—211) was obtained which corresponds to 98.7 percent of the theoretical yield.

EXAMPLE VI

A 500 ml. three-necked flask equipped with stirrer, drying tube, nitrogen purge, thermometer, jacketed addition funnel and ice-water cooled condenser with Dry Ice condenser at the top, was charged with 80.2 g. (0.3 mole) of 4,4'-methylene bis(2-chloroaniline) and 3.0 g. (3.75 percent by weight based on 4,4'-methylene bis(2-chloroaniline)) of powdered potassium hydroxide. The mixture was heated to 110° C.; stirring was started when the 4,4'-methylene bis(2-chloroaniline) had completely melted. A total of 158.4 g. (3.6 moles) of ethylene oxide was added dropwise starting at 110° C. and at such a rate that the temperature of the reaction mixture was maintained at below 120° C. The addition of ethylene oxide was terminated after a ratio of 12 moles of ethylene oxide per mole of 4,4'-methylene bis(2-chloroaniline) had been reached. The reaction flask was cooled to a temperature of 105° C. and 178.0 g. (2.4 moles) of glycidol was added in a dropwise manner while the pot temperature was held under 110° C. After the addition of the glycidol had been completed, the reaction mixture was maintained at 105° C. for another hour. Low boiling components were then removed from the reaction mixture by heating to 225° C. under a vacuum of 0.1 mm. Hg. A total of 408.8 g. of liquid product (hydroxyl number—451) was obtained, which corresponds to 98.4 percent of theory.

EXAMPLE VII

A 1000 ml. three-necked flask equipped with stirrer, drying tube, nitrogen inlet tube, thermometer, addition funnel, and ice-water cooled condenser was charged with 93.1 g. (0.5 mole) of p,p'-bisphenol, 450 ml. of dimethyl ether of triethylene glycol, and 3.0 g. (3.22 percent by weight based on p,p'-bisphenol) of powdered potassium hydroxide. Stirring was started and the mixture was heated to 130° C. A total of 444 g. (6.0 moles) of glycidol was added dropwise starting at 130° C. and at such a rate that the temperature of the reaction mixture was maintained between 130 and 150° C. The addition of glycidol was terminated after a ratio of 12 moles of glycidol per mole of p-phenoxyphenol had been reached. The reaction mixture was maintained at 130° C. for one hour after all the glycidol had been added. Low boiling components were removed from the resulting product by heating to 225° C. under a vacuum of 0.1 mm. Hg. A total of 64.8 g. of liquid product was obtained, corresponding to a 38.8 percent yield.

EXAMPLE VIII

A 300 ml. three-necked flask equipped with stirrer, drying tube, thermometer, jacketed addition nitrogen inlet tube and ice-water cooled condenser with Dry Ice condenser on top, was charged with 39.6 g. (0.2 mole) of p,p'-methylenedianiline and 1.63 g. of powdered potassium hydroxide. The mixture was then heated to 140° C. with stirring. A total of 70.4 g. (1.6 moles) of ethylene oxide was added dropwise starting at 140° C. and at such a rate that the temperature of the reaction mixture was maintained between 140 and 160° C. The addition of ethylene oxide was terminated after a molar ratio of ethylene oxide added per mole of p,p'-methylene dianiline of 8:1 had been attained. The reaction mixture was cooled to a temperature of 130° C. and 120.4 g. (1.6 moles) of glycidol was added in a dropwise manner and at such a rate that the pot temperature remained below 150° C. After the glycidol had been introduced, the reaction mixture was maintained at 130° C. for another hour. Low boiling components were removed from the resulting product by heating to 225° C. in a vacuum of 0.1 mm. Hg. A total of 226.0 g. of liquid product (hydroxyl number—551) was obtained corresponding to a 98 percent yield.

EXAMPLE IX

To the same apparatus as described in Example III there was charged 64.0 g. (0.25 mole) of 4,4'-methylene bis(2,6-dimethylphenol) and 3.0 g. (4.69 percent by weight based on 4,4'-methylene bis(2,6-dimethylphenol)) of powdered potassium hydroxide. The mixture was heated to 180° C. with stirring. A total of 111.0 g. (1.5 moles) of glycidol was added dropwise starting at 180° C. and at such a rate that the temperature of the reaction mixture was maintained between 180° C. and 190° C. The addition of glycidol was terminated after a molar ratio of glycidol to 4,4'-methylene bis(2,6-dimethylphenol) of 6:1 had been reached. The reaction mixture was maintained at 180° C. for one hour after the addition was completed. Low boiling components were then removed from the resulting product by heating to 225° C. under a vacuum of 0.1 mm. Hg. A total of 165.6 g. of product (hydroxyl number—654) was obtained which corresponds to 94.8 percent of the theoretical yield.

EXAMPLE X

To the same apparatus as employed in Example V there was charged 342 g. (1.5 moles) of bisphenol A and 8.0 g. (2.34 percent by weight based on bisphenol A) of powdered potassium hydroxide. The mixture was heated to 140° C. with stirring. A total of 1188 g. (27 moles) of ethylene oxide was added dropwise starting at 140° C. and at such a rate that the temperature of the reaction mixture was maintained between 140 and 150° C. The addition of ethylene oxide was terminated after a molar ratio of ethylene oxide to bisphenol A of 18:1 had been reached. The temperature of the reaction mixture was then lowered to 105° C. and 444.0 g. (6.0 moles) of glycidol was added in a dropwise manner at such a rate that the pot temperature remained under 120° C. When the addition of glycidol had been completed, the reaction mixture was maintained at 105° C. for an additional hour. Low boiling components were then removed from the resulting product by heating to 225° C. in a vacuum of 0.1 mm. Hg. A total of 1906 g. of liquid product (hydroxyl number—348), which corresponds to 96.6 percent of the theoretical yield, was obtained.

EXAMPLE XI

To apparatus of the type utilized in Example VI there was charged 89.67 g. (0.35 mole) of 4,4'methylene bis(2-chlorophenol), (dichlorophene), and 2.7 g. (3.1 percent by weight based on dichlorophene) of powdered potassium hydroxide. The mixture was heated to 160° C. with stirring. A total of 261.6 g. (5.94 moles) of ethylene oxide was added dropwise starting at 160° C. and at such a rate that the temperature of the reaction mixture was maintained below 170° C. The addition of ethylene oxide was terminated after a molar ratio of 18:1 of ethylene oxide to 4,4'-methylene bis-(2-chlorophenol) had been reached. One half of the above product (170.7 g. of 0.161 mole) was reacted with 74.0 g. (1 mole) of glycidol at 110° to 120° C. After the addition of the glycidol had been completed, the reaction mixture was maintained at 105° C. for one hour. In the next step the low boiling components were removed from the resulting product by heating to 225° C. under a vacuum of 0.2 mm. Hg. A total of 242.6 g. of liquid product (hydroxyl number—313), which corresponds to 98.8 percent of the theoretical yield, was recovered.

EXAMPLE XII

To equipment of the same type as utilized in Example III there was charged 60.0 g. (0.3 mole) of oxydianiline and 2.0 g. (3.34 percent by weight based on oxydianiline) of powdered potassium hydroxide. The oxydianiline was reacted with 89.8 g. (1.2 moles) of glycidol at 180° C. in the same manner as described in Example IX. From the resulting product low boiling components were removed by heating to 225° C. under a vacuum of 0.1 mm. Hg. A total of 142.5 g. of liquid product (hydroxy number—869) was obtained which corresponds to 95.3 percent of the theoretical yield.

EXAMPLE XIII

To apparatus of the same type as employed in Example III there was charged 45.3 g. (0.25 mole) α-phenyl-p-cresol and 1.7 g. of potassium hydroxide (3.75 percent by weight based on α-phenyl-p-cresol). A total of 74.0 g. (1 mole) of glycidol was added dropwise starting at 105° C. and at such a rate that the temperature of the reaction mixture was maintained below 110° C. The addition of glycidol was terminated after a molar ratio of glycidol to α-phenyl-p-cresol of 4:1 had been attained. The reaction was maintained at 180° C. for one hour after the addition had been completed. From the resulting product low boiling components were removed by heating to 225° C. under a vacuum of 0.1 mm. Hg. A total of 117.3 g. of liquid product (hydroxyl number—567) was obtained which corresponds to 98.2 percent of the theoretical yield.

EXAMPLE XIV

To the same apparatus as utilized in Example III there was charged 74.09 g. (0.4 mole) p-phenoxyaniline and 2.5 g. (3.38 percent by weight based on phenoxyaniline) of powdered potassium hydroxide. The mixture was heated to 125° C. and stirring was started when the phenoxyaniline had completely melted. A total of 118.4 g. (1.6 moles) of glycidol was added dropwise starting at 125° C. and at such a rate that the temperature of the reaction mixture was maintained below 145° C. The addition of glycidol was terminated after a molar ratio of glycidol to p-phenoxyaniline of 4:1 had been attained. The reaction mixture was maintained at 125° C. for one hour after the addition had been completed after which the resulting low boiling components were removed by heating to 225° C. under a vacuum of 0.1 mm. Hg. A total of 184.9 g. of liquid product (hydroxyl number—664) was obtained which corresponds to 99 percent of the theoretical yield.

EXAMPLE XV

A 500 ml. three-necked flask equipped with a stirrer, drying tube, thermometer, nitrogen inlet tube, jacketed addition funnel and ice-water cooled condenser with a Dry Ice condenser at the top, was charged with 39.0 g. (0.2 mole) of p-anilinophenol and 0.1 g. (2.56 percent by weight based on p-anilinophenol) of powdered potassium hydroxide. The mixture was then heated to 110° C.

with stirring. A total of 158.4 g. (3.6 moles) of ethylene oxide was added dropwise starting at 110° C. and at such a rate that the temperature of the reaction mixture remained below 150° C. The addition of ethylene oxide was terminated after a molar ratio of ethylene oxide to p-anilinophenol of 18:1 had been reached. The reaction mixture was then cooled to a temperature of 103° C. and 29.6 g. (0.4 mole) of glycidol was added in a dropwise manner and at such a rate that the temperature remained below 110° C. After the addition of the glycidol had been completed, the reaction mixture was held at 105° C. for one hour. In the next step low boiling components were removed from the resulting product by heating to 225° C. under a vacuum of 0.1 mm. Hg. A total of 214.7 g. of fluid product (hydroxyl number—202) was obtained which corresponds to 94.5 percent of the theoretical yield.

EXAMPLE XVI

A total of 99.13 g. (0.5 mole) of p,p'-methylenedianiline, 148 g. (2.0 moles of glycidol) and 2.0 g. potassium hydroxide were reacted as described in Example XII at a temperature range of 110–130° C. From the reaction mixture there was obtained a total of 231.8 g. (93.5 percent of the theory) of a viscous fluid product which had a hydroxyl number of 893.

EXAMPLE XVII

Bisphenol (46 g., 0.33 mole), glycidol (99.2 g., 1.32 moles), potassium hydroxide (2 g.) were reacted as described in Example IX but a temperature range of 130–150° C. was employed. A total of 168.3 g. (96.09 percent of the theoretical yield) of a fluid product (hydroxyl number—623) was recovered.

EXAMPLE XVIII

A total of 93.5 g. (0.5 mole) of p-phenoxyphenol, 148.0 g. (2.0 moles) of glycidol, and 3.0 g. of potassium hydroxide were reacted together in the manner described in Example XIII while the reaction temperature was maintained between 105–120° C. Yield: 232.0 g. of a liquid product (hydroxyl number—581) which corresponds to 96 percent of the theory.

EXAMPLE XIX

Phenoxyaniline (55.6 g., 0.3 mole), ethylene oxide (237.6 g., 5.4 moles) glycidol (88.8 g., 1.2 moles) and potassium hydroxide (2.0 g.) were reacted in a manner described in Example VIII. The addition of ethylene oxide was carried out between 130–150° C. and that of glycidol between 130 and 140° C. A total of 359.1 g. of a liquid product (94.2 percent of the theoretical quantity) was recovered.

EXAMPLE XX

A total of 40 g. (0.2 mole) of oxydianiline, 105.6 g. (2.4 moles) of ethylene oxide, 59.2 g. (0.8 mole) of glycidol, and 2.0 g. of potassium hydroxide were reacted as described in Example VIII. The addition of ethylene oxide was carried out at a temperature of 165–180° C. while that of glycidol was added at 115–125° C. A total of 192.2 g. (93.8 percent of the theoretical yield) of a viscous, liquid product (hydroxyl number—371) was recovered from the reaction mixture.

The outstanding physcial properties of the novel oxyalkylated fluid compositions of this invention are set forth in Tables 1 and 2 which follow:

TABLE 1

| Product | OH No. | Miscibility with water | | | | Viscosities of water solutions | | |
|---|---|---|---|---|---|---|---|---|
| | | Deionized [1] | Sea | At elevated temp. | | Concentration, percent | 150° F., centistokes | 25° F., centistokes |
| | | | | 150° F. | 212° F. | | | |
| Example I | 690 | Sol. | Sol. | Sol. | Sol. | 40 / 65 / 80 | 4.3 / 28.5 / 168.5 | 3,567 |
| Example II | 675 | Insol. | Insol. | Insol. | Insol. | | | |
| Example III | 556 | Insol. | Insol. | Insol. | Insol. | | | |
| Example IV | 162 | Sol. | Sol. below 95° C. | Sol. | Sol. | 80 / 65 / 40 | 68.3 / 30.8 / 9.2 | 2,815 |
| Example V | 211 | Sol. | Insol. at. B.P. | Sol. | Sol. | 80 / 75 / 40 | 31.9 / 25.7 / 6.5 | 2,092 |
| Example VI | 451 / 452 | | | | | 100.0 | 6,180.5 | |
| Example VII | | Sol. | Pptcd. salt. | Sol. | Sol. | | | |
| Example VIII | 551 | Sol. | Sol. | Sol. | Sol. | 40 / 63 / 90 | 6.5 / 31.1 / 160.4 | 1,917 |
| Example IX | 654 | Sol. | Sol. | Sol. | Sol. | 40 / 58 / 80 | 7.2 / 30.8 / 410.7 | 5,054 |
| Example X | 348 | Sol. | Sol. | Sol. | Sol. | 80 / 70 / 40 | 54 / 28.6 / 4.9 | 2,382 |
| Example XI | 313 | Sol. | Sol. | Sol. | Sol. | 80 / 40 | 29.2 / 7.2 | 4,035 |
| Example XII | 869 | Sol. | Sol. | Sol. | Sol. | 40 / 62 / 80 | 3.8 / 25.9 / 147.5 | 3,604 |
| Example XIII | 567 | Sol. | Sol. | Sol. | Sol. | 80 / 58 / 40 | 94 / 25.1 / 6.2 | 2,791 |
| Example XIV | 664 | Sol. | Sol. | Sol. | Sol. | 40 / 58 / 80 | 8.2 / 31.1 / 219 | 6,093 |
| Example XV | 202 / 204 | | | | | 100.0 | 206.2 | |
| Example XVI | 893 | Sol. | Sol. | Sol. | Sol. | 40 / 63 / 80 | 4.45 / 25.4 / 275.4 | 3,864 |
| Example XVII | 623 | Sol. | Sol. | Sol. | Sol. | 40 / 57 / 80 | 6.1 / 30.6 / 302.0 | 9,170 |
| Example XVIII | 581 | Sol. | Sol. | Sol. | Sol. | 40 / 64 / 80 | 3.8 / 25.4 / 86.4 | 7,115 |
| Example XIX | | Sol. | Sol. | Sol. | Insol. | 40 / 64 / 80 | 9.7 / 28.6 / 78.5 | 1,165 |
| Example XX | 371 | Sol. | Sol. | Sol. | Sol. | 80 / 64 / 40 | 95 / 28.1 / 4.8 | 1,366 |

[1] At room temperature.

TABLE 2

| Product | Pour point[1] (° F.) | Flash point (° F., Clev. Open Cup) | Flame point (° F., Clev. Open Cup) | Autogenous ignition temp. (° F.) |
|---|---|---|---|---|
| Example I | 0 | 540 | [2] 560 | 975 |
| Example II | | | | 1,025 |
| Example III | | | | 1,150 |
| Example IV | −20 | [3] 520 | [3] 520 | 900 |
| Example V | −20 | [3] 530 | [3] 530 | 900 |
| Example VI | | | | 875 |
| Example VII | | | | 1,025 |
| Example VIII | −20 | [4] 490 | [4] 490 | 750 |
| Example IX | +15 | 495 | [2] 510 | 1,000 |
| Example X | −20 | [4] 500 | [4] 500 | 900 |
| Example XI | +5 | [4] 520 | [4] 520 | 775 |
| Example XII | | | | 1,050 |
| Example XIII | +20 | 495 | 520 | 825 |
| Example XIV | +20 | [3] 490 | 490 | 850 |
| Example XV | | 520 | 520 | 925 |
| Example XVI | +20 | [4] 540 | [2] 540 | 925 |
| Example XVII | +15 | [4] 490 | [4] 490 | 775 |
| Example XVIII | 0 | 480 | 590 | 975 |
| Example XIX | −20 | 540 | [3] 550 | 775 |
| Example XX | −20 | [3] 470 | [3] 470 | 875 |

[1] The pour points shown relate to aqueous solutions for which viscosity at 25° F. was determined.
[2] Product boiled at this temperature but did not produce a permanent flame.
[3] Product boiled at this temperature but did not flash or burn.
[4] Product boiled at this temperature but did not flash.

What is claimed:

1. A polyoxyalkylated, water soluble, fire-resistant fluid prepared by condensing ethylene oxide with a hydroxy-substituted diphenyl methane of the formula:

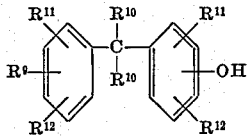

wherein $R^9$ is selected from the group consisting of hydrogen and —OH, $R^{10}$ is selected from the group consisting of hydrogen and alkyl of from 1 to 5 carbon atoms and wherein $R^{11}$ and $R^{12}$ are independently selected from the group consisting of hydrogen, alkyl of from 1 to 5 carbon atoms, fluorine, chlorine and bromine, to form a polyoxyethylene intermediate product and subsequently condensing said polyoxyethylene intermediate product with glycidol; the amount of said ethylene oxide used being from about 1 mole to about 16 moles per reactive hydrogen atom of the said compound and the amount of the said glycidol used being from about 1 mole to about 6 moles per reactive hydrogen atoms of the said compound.

2. The fluid of claim 1 wherein said hydroxy-substituted diphenyl methane is 4,4'-methylene bis(2-chlorophenol).

3. The fluid of claim 1 where said hydroxy-substituted diphenyl methane is bisphenol A.

References Cited

UNITED STATES PATENTS

| 2,131,142 | 9/1938 | Orthner et al. | 260—613 |
| 2,499,370 | 3/1950 | DeGroote et al. | 260—613 |
| 2,572,886 | 10/1951 | DeGroote et al. | 260—611 |
| 2,594,541 | 4/1952 | DeGroote et al. | 260—613 |
| 2,859,250 | 11/1958 | Woodbridge et al. | 260—613 |
| 3,159,591 | 12/1964 | Lanham | 260—2.5 |

BERNARD HELFIN, Primary Examiner

U.S. Cl. X.R.

252—73; 260—570, 571, 576